Patented July 22, 1924.

1,502,275

UNITED STATES PATENT OFFICE.

HORACE A. SHONLE AND ASHER MOMENT, OF INDIANAPOLIS, INDIANA, ASSIGNORS TO THE ELI LILLY & COMPANY, OF INDIANAPOLIS, INDIANA, A CORPORATION OF INDIANA.

HYDRIODIDE OF THE ESTER OF 2-PHENYL QUINOLINE 4-CARBOXYLIC ACID.

No Drawing.   Application filed July 18, 1921.   Serial No. 485,639.

*To all whom it may concern:*

Be it known that we, HORACE A. SHONLE and ASHER MOMENT, citizens of the United States, residing at Indianapolis, in the county of Marion and State of Indiana, have invented new and useful Hydriodides of the Esters of 2-Phenyl Quinoline 4-Carboxylic Acid, of which the following is a specification.

Our invention relates to the previously unknown combination of hydriodic acid with the esters of 2-phenyl quinoline 4-carboxylic acid, and more specially the esters of the paraffin series, especially the ethyl ester.

Among the esters of 2-phenyl quinoline 4-carboxylic acid which may be used for the preparation of the hydriodic-acid compounds are the ethyl, propyl, n-butyl, and iso-butyl, of the paraffin series; the allyl, of the olefin series; and the benzyl, of the aromatic series. These esters may be prepared either by boiling the 2-phenyl quinoline 4-carboxylic acid with an excess of the corresponding anhydrous alcohol in the presence of a stream of dry hydrochloric acid gas, or by preparing the acid chloride of 2-phenyl quinoline 4-carboxylic acid and causing this to react with the alcohol corresponding to the desired ester. The propyl, n-butyl, and iso-butyl esters crystallize from alcohol in colorless prisms, which melt at 63° to 64° C., 56° to 57° C., and 39° to 40° C., respectively; these crystals are readily soluble in hot alcohol and acetone, but are almost insoluble in water.

These hydriodic-acid compounds of the esters of 2-phenyl quinoline 4-carboxylic acid may be represented by the following structural formula, in which X represents any hydrocarbon radical which combines with 2-phenyl quinoline 4-carboxylic acid to produce an ester thereof:

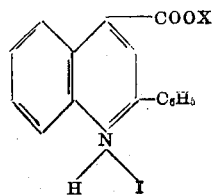

The hydriodic-acid compounds can be prepared by two methods: First, by treating the chosen ester of 2-phenyl quinoline 4-carboxylic acid with hydriodic acid, using at least a molecular proportion and preferably an excess thereof, and then drying; or second, by dissolving the chosen ester of 2-phenyl-quinoline 4-carboxylic acid in alcohol or other suitable organic solvent, and then adding to this solution a molecular proportion, or more, of hydriodic acid, whereupon the hydriodide of the ester of 2-phenyl quinoline 4-carboxylic acid can be crystallized from the solution and filtered off and dried. With either method of preparation the drying should not be continued too long, as it causes loss of hydriodic acid.

The crystals obtained may or may not contain water of crystallization. The first method gives crystals which usually initially contain water of crystallization, whereas the crystals obtained by the second method apparently sometimes contain water of crystallization and sometimes do not. The hydrated crystals and the anhydrous crystals are usually different in color and have different melting points, the hydrated crystals tending toward a yellow color and having a lower melting point, and the anhydrous crystals toward a red color and having a higher melting point.

For an example, to produce the hydriodide of the ethyl ester of 2-phenyl quinoline 4-carboxylic acid by the second method outlined above, 5 grams of this ester are dissolved in 10 c. c. of 95% alcohol with warming, and to this solution 5 c. c. (representing approximately 1½ moles) of 45% hydriodic acid are added. On cooling, needle-shaped orange-red crystals form, which are filtered off and re-crystallized (for purification) from a small amount of 95% alcohol, and dried in the air. These are the anhydrous crystals, and they melt at 167° to 169° C. If the hydriodide of this ethyl ester is formed by the first method outlined above, the crystals obtained contain water of crystallization, are deep yellow in color, and melt at 119° to 120° C.

2-phenyl quinoline, 4-carboxylic acid propyl ester hydriodide when prepared by either method forms hydrated crystals which are needle-shaped and yellow in color and which after recrystalization from 95% alcohol and drying in the air melt at 109° to 111° C.; and which upon drying for forty eight hours in a vacuum dessicator lose their water of crystallization, turn a deep orange color, and melt at 151° to 153° C. These anhydrous crystals in the course of twenty four hours take up moisture from the air and revert to the hydrated form.

2-phenyl quinoline 4-carboxylic acid n-butyl ester hydriodide when prepared by either method forms hydrated crystals which are needle-shaped and deep yellow in color and which after recrystallization from 95% alcohol and drying rapidly in the air melt at 94° to 96° C.; and which on standing in the air or drying for three or four hours in a vacuum dessicator lose their water of crystallization, turn a deep orange-red color, and melt at 151° to 153° C.

2-phenyl quinoline 4-carboxylic acid isobutyl ester hydriodide when prepared by either method forms hydrated crystals which are needle-shaped and orange-yellow in color and which after recrystallization from 95% alcohol and drying in the air melt at 104° to 105° C.; and which on standing in the air, or drying in a vacuum dessicator for three or four hours, lose their water of crystallization, turn a deep orange-red color, and melt at 173° to 174° C.

2-phenyl quinoline 4-carboxylic acid allyl ester hydriodide when prepared by either method forms hydrated crystals which are needle-shaped and orange-yellow in color and which after recrystallization from 95% alcohol and drying in the air melt at 92° to 94° C.; and which upon drying in a vacuum dessicator for forty eight hours lose their water of crystallization, turn to a deep orange color, and melt at 123° to 125° C.

2-phenyl quinoline 4-carboxylic acid benzyl ester hydriodide prepared by the second method given above forms anhydrous crystals which have a metallic purple luster and after recrystallization from 95% alcohol and drying in the air or in a vacuum dessicator melt at 125° to 127° C.

We claim as our invention:

1. The hydriodide of an ester of 2-phenyl quinoline 4-carboxylic acid, represented by the following structural formula:

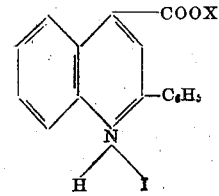

in which X represents any hydrocarbon radicle which combines with 2-phenyl quinoline 4-carboxylic acid to produce an ester thereof.

2. The hydriodide of 2-phenyl quinoline 4-carboxylic acid ethyl ester, represented by the following structural formula:

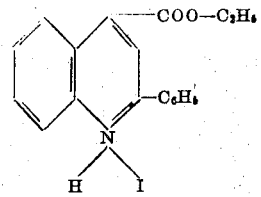

3. The hydriodide of an ester of the paraffin series of 2-phenyl quinoline 4-carboxylic acid.

In witness whereof, we have hereunto set our hands at Indianapolis, Indiana, this 6th day of July, A. D. one thousand nine hundred and twenty-one.

HORACE A. SHONLE.
ASHER MOMENT.